July 10, 1951 C. W. BARKER 2,559,925
WORK HOLDER DEVICE
Filed Jan. 29, 1945 3 Sheets-Sheet 1
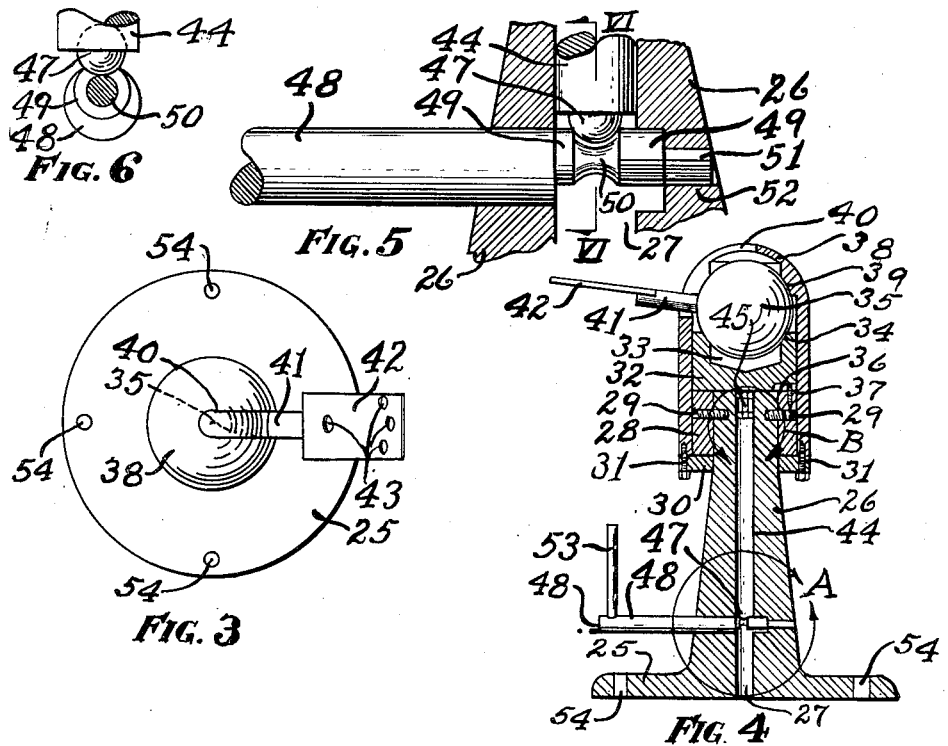
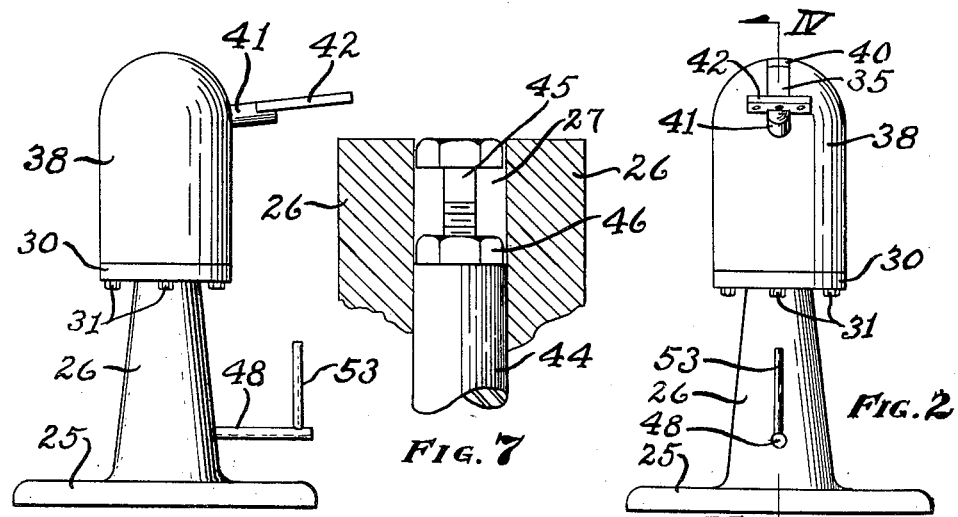
INVENTOR.
Clemon W. Barker
BY
M. Y. Charles
ATTORNEY July 10, 1951  C. W. BARKER  2,559,925
WORK HOLDER DEVICE Filed Jan. 29, 1945  3 Sheets-Sheet 2

INVENTOR.
Clemon W. Barker
BY
M. Y. Charles
ATTORNEY

July 10, 1951      C. W. BARKER      2,559,925
WORK HOLDER DEVICE
Filed Jan. 29, 1945      3 Sheets-Sheet 3
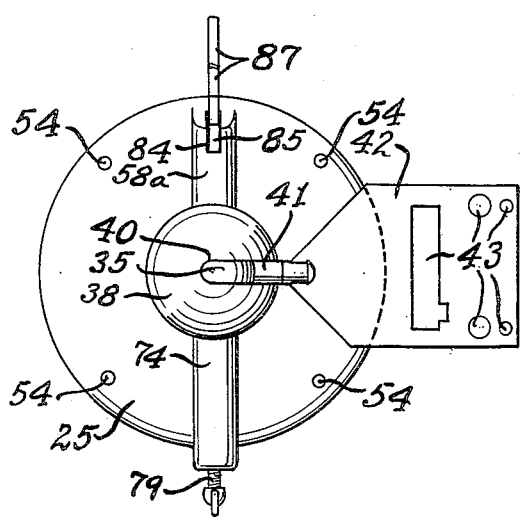
FIG. 18
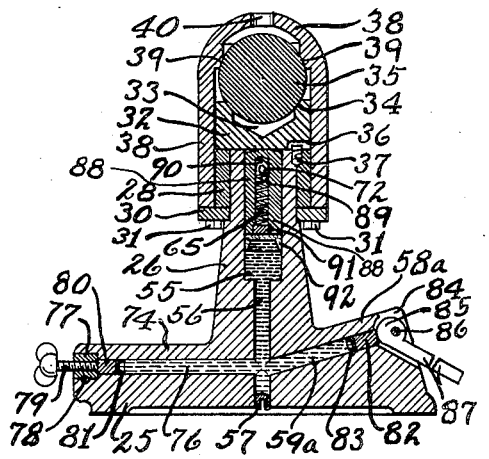
FIG. 19
FIG. 20
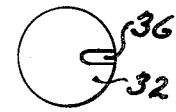
FIG. 21
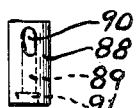
FIG. 22
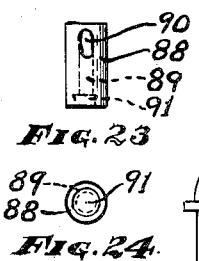
FIG. 23
FIG. 24
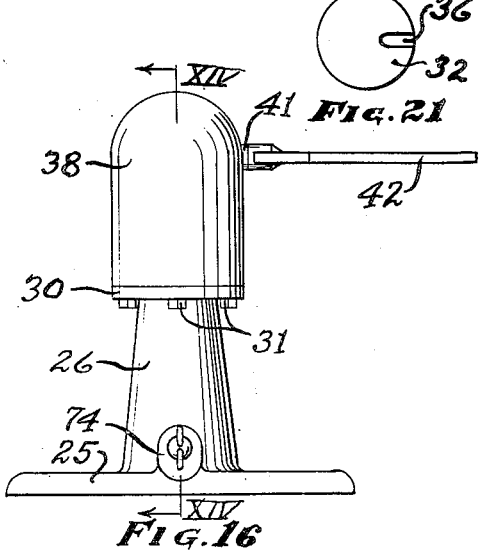
FIG. 16
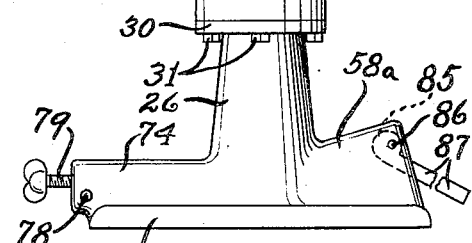
FIG. 17
INVENTOR.
Clemon W. Barker
BY
M. Y. Charles
ATTORNEY.

Patented July 10, 1951

2,559,925

UNITED STATES PATENT OFFICE 2,559,925

WORK HOLDER DEVICE

Clemon W. Barker, Wichita, Kans., assignor, by mesne assignments, to Wilton Tool Manufacturing Co., Chicago, Ill., a copartnership Application January 29, 1945, Serial No. 575,051

7 Claims. (Cl. 287—12)

My invention relates to an improvement in work holding devices, and is an improvement over my Patent Number 2,354,937, bearing date August 1, 1944.

The object of the present invention is to provide a work holding device having a ball and socket as means for universal adjustment of the work holding element, and the new improvement lies in a more secure means of holding the ball, and improved methods of applying pressure to the ball. The present improvement also includes means of adjustment governing the application of pressure to the ball. These and other objects will be more fully described as this description progresses.

Now referring to the accompanying drawings; Fig. 1 is a side view of the mechanically operated work holding device.

Fig. 2 is a side view of the same device as shown in Fig. 1, except that the device is turned ninety degrees from that shown in Fig. 1.

Fig. 3 is a top plan view of the work holder device as shown in Fig. 1.

Fig. 4 is a vertical sectional view through the work holder device, the view being taken along the line IV—IV in Fig. 2, and looking in the direction of the arrows.

Fig. 5 is an enlarged detail sectional view of that portion of the device contained in the circle A in Fig. 4.

Fig. 6 is a detail sectional view through a portion of the work holder device, the view being taken along the line VI—VI in Fig. 5 and looking in the direction of the arrows.

Fig. 7 is an enlarged detail sectional view of that part of the work holder device contained in the circle B in Fig. 4.

Fig. 13 is a top plan view of the ball engaging plunger shown in Fig. 11.

Fig. 14 is a bottom plan view of the ball engaging plunger shown in Fig. 11.

Fig. 15 is a detail side view of the ball engaging plunger shown in Fig. 11.

Fig. 16 is a side view of a modified form of the hydraulically operated work holder device.

Fig. 17 is a side view of the hydraulically operated work holder device, the device being turned ninety degrees from that shown in Fig. 16.

Fig. 18 is a top plan view of the hydraulically operated work holder device shown in Fig. 16.

Fig. 19 is a vertical sectional view through the hydraulically operated work holder device, the view being taken along the line XIV—XIV in Fig. 16 and looking in the direction of the arrows.

Fig. 20 is a top plan view of elevatable ball seat element shown in Fig. 19.

Fig. 21 is a bottom plan view of the elevatable ball seat element shown in Fig. 19.

Fig. 22 is a top plan view of the plunger element that engages and raises the elevatable ball seat element shown in Fig. 19.

Fig. 23 is a side view of the plunger element that engages and raises the elevatable ball seat element shown in Fig. 19.

Fig. 24 is a bottom plan view of the plunger element that engages and raises the elevatable ball seat element shown in Fig. 19.

Similar numerals of reference designate the same parts throughout the several figures of the drawings.

Figure 10:
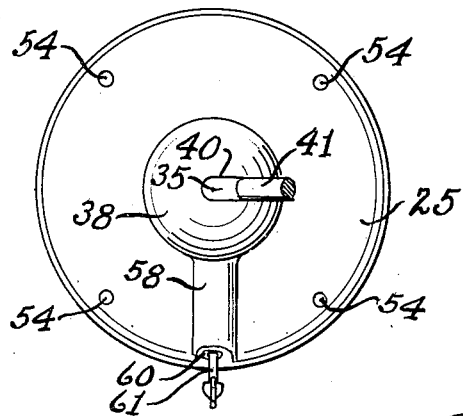
Fig. 10 is a stop plan view of the hydraulically operated work holder device.

In the drawings, Figures 1 to 7 inclusive, is shown the mechanically operated work holder device as having a foot or base element 25, on which is integrally formed a vertically positioned standard 26 having a bore 27 that is positioned on the vertical axis of the standard 26 and extends from end to end thereof and also passes through the foot or base member 25.

Around the upper end of the standard 26 and tightly fitted thereon is a sleeve element 28 that is rigidly fixed to the standard 26 by means of pins 29 that are passed through the wall of the sleeve 28 and the ends of the pins 29 being entered into holes in the standard 26 as shown.

Beneath the sleeve 28 and revolvably positioned around the standard 26 is a collar 30 that engages the bottom edge of the sleeve 28 and the outside edge of the collar 30 extends beyond the outside surface of the sleeve 28. The outer edge of the collar 30 is provided with a series of holes to receive cap screws 31 as will later be described.

Resting on top of sleeve 28 and upper end of the standard 26 is a ball rest element 32 that is provided with a depression 33 and around the upper edge of the depression 33 is a ball seat 34 on which is seated a ball 35. The under side of the ball rest element is provided with a radially disposed slot 36. Rigidly set in the upper end of the sleeve 28 is an upwardly projecting pin 37 that projects into the slot 36 in the ball rest element 32 and serves to station or prevent the rotary movement of the ball rest element 32.

Positioned over the ball 35 and resting on the outer edge of the collar 30 is a ball socket cap 38, the lower end or skirt of which is rigidly attached to the collar element 30 by means of the cap screws 31 which pass through the collar 30 and are threaded into the lower end or skirt of the ball socket cap element 38. In the upper interior portion of the ball socket cap element 38 is a ball seat 39 that rests on the ball 35. The ball socket cap element 38 is provided with a slot 40 that extends from the center of the top of the ball socket cap element 38 to a point about ninety degrees down the side of the curved top of the ball socket cap element 38.

Rigidly mounted on the ball 35 is an outwardly projecting pin 41 that slidably and revolvably passes through the slot 40 and projects therefrom. The outer end of the pin 41 is adapted to detachably receive a work holding element 42. The plate 42 is detachably attached to the pin 41 and therefore numerous types and designs of work holder devices may be employed and attached to the pin 41. In the drawings the work holding element is shown as a plate 42 having various sized and shaped holes 43 to fit various kinds of work that may be attached thereto.

Slidably mounted in the bore 27 of the standard 26 is a shaft 44 the upper end of which is provided with an adjustment comprised of a cap screw 45 that is threaded into the upper end of the shaft 44, there being a nut 46 threaded on the screw 45 and adapted to be screwed against the upper end of the shaft 44 as a means of locking the cap screw 45 in its adjusted position.

The head of the cap screw 45 is adapted to engage the bottom of the ball support element 32 for raising and lowering the ball support element 32 for purposes that will later be described. The lower end of the shaft 44 is provided with a ball seat in which is seated a ball 47.

The lower portion of the standard 26 is provided with a transversely positioned shaft 48 that is revolvably mounted in the standard 26. Integrally formed on the inner end of the shaft 48 is an eccentrically positioned pin 49 that is provided with a curved bottom groove 50 the outer edges of which engage and support the ball 47. Integrally formed on the outer end of the eccentric pin 49 is a second pin 51 that is in axial alignment with the shaft 48 and is revolvably seated in a bearing 52 formed by drilling a hole in the opposite side of the standard from that in which the shaft 48 is journalled so that by turning the shaft 48 the eccentric pin 49 eccentrically rotates and therefore moves the shaft 44 up or down which in turn moves the ball support element 32 up or down to rigidly bind the ball 35 between the two ball seats 34 and 39. The outer end of the shaft is provided with a handle element 53 by which the shaft 48 may be revolved. The foot or base element 25 is provided with holes 54 through which screws or bolts may be passed to fasten the work holder device to a bench top or other suitable support therefor.

The operation of the device shown in Figures 1 to 7 inclusive is as follows: The work, such as a carburetor, a timer, generator or starter, or any other piece of equipment that it is desirable to hold in some adjusted position so that it can be easily worked on, is rigidly attached to the holder plate 42 by means of bolts or clamps or other suitable means. This having been done the work may be revolved around the vertical axis of the standard 26, it may also be rocked from any position from horizontal to vertical, and it may also be revolved to any desired point around the axis of the support pin 41. The work having been adjusted to its desired position, selected from the movements above described, the handle 53 is rocked to turn the shaft 48 and thereby rock the eccentric pin 49 to its elevated position which in turn raises the push shaft 44 to raise the ball support element 32 to rigidly bind and hold the ball 35 between the ball seats 34 and 39, the ball 35 in turn rigidly holding the pin 41, work holder plate 42, and the work thereon in its adjusted position. When it is desired to change the position of the work the handle 53 is turned to turn the shaft 48 and eccentric pin to its lowered position, whereupon the push shaft 44 and ball support element 32 will be lowered to release the ball 35 from the grip of the ball seats 34 and 39, whereupon the work may be readjusted to any new desired position and relocked therein as above described.

In revolving the work about the vertical axis of the standard 26 the ball socket cap 38 and collar 30 will revolve and because of the pin 41 being in the slot 40 in the socket cap 38 the ball 35 will also revolve with the socket cap 38, but the ball support element 32 will remain stationary due to the pin 37 being positioned in the slot 36 in the bottom of the ball support element 32. The work support pin 41 passing through the slot 40 is movable in the slot 40 from the horizontal to the vertical position, and the ball 35 and pin 41 thereon are revolvable about the axis of the pin 41, hence the work support plate supported by the pin 41 may be placed in any universally selected adjusted position and then locked as above described.

The ball seats 34 and 39 being designed and situated as they are, engage the ball 35 on opposite sides in a pair of large concentric circles around a center axis passing through both circles. By the use of this arrangement the ball 35 may be more rigidly held with considerably less pressure on the ball support element 32 than was possible in my previous design in my Patent No. 2,354,937.

The cap screw 45 may be screwed in or out to shorten or lengthen the effective length of the push shaft 44 to where the most effective pressure may be applied to the ball support element 32 with the least revolving movement of the shaft 48.

The ball 35, ball socket cap element 38 with all its details, the collar 30, and sleeve 28, and associated assembly on the standard 26 are identical in all the figures of the drawings and are as shown and above described.

Figure 11:
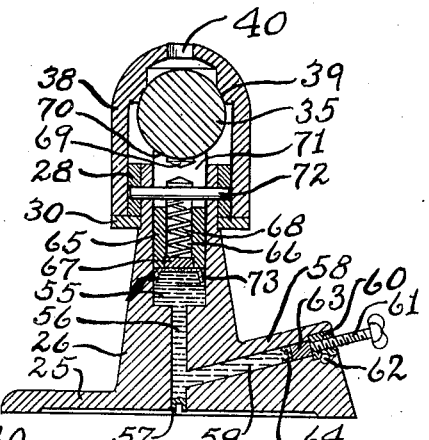
Fig. 11 is a vertical sectional view of the hydraulically operated work holder device, the view being taken along the line XI—XI in Fig. 9 and looking in the direction of the arrows.
Figure 12:
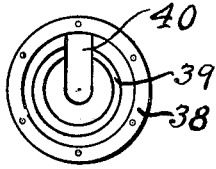
Fig. 12 is a bottom plan view of the cap element of the ball and socket arrangement.
Figure 9:
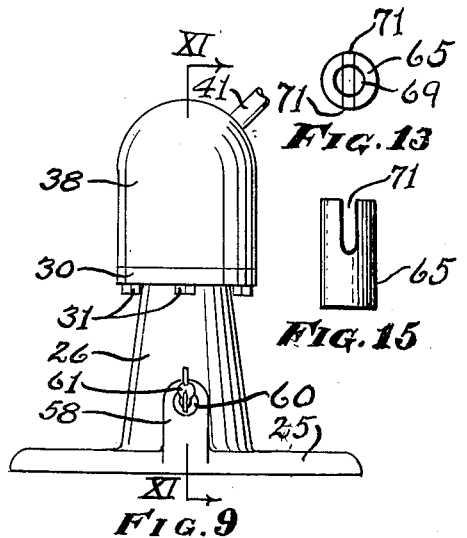
Fig. 9 is a side view of the hydraulically operated work holder device, the device being turned ninety degrees from that shown in Fig. 8.
Figure 8:
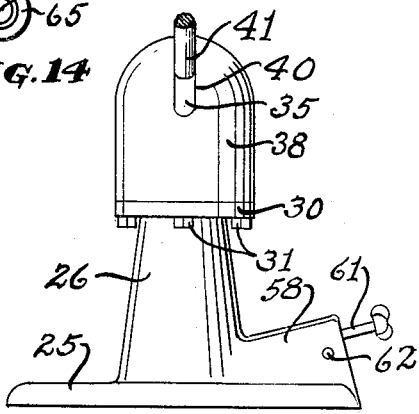
Fig. 8 is a side view of the hydraulically operated work holder device.

In Figures 8 to 15 inclusive is shown a modification of the work holder device in which the device is hydraulically operated instead of mechanically operated. In this modification the standard 26 is provided with a bore in the upper part thereof which forms a cylinder. Connecting with the bore 55 and extending downwardly therefrom through the balance of the standard 26 is a small bore 56, the bottom end of which is provided with, or is closed, by a plug 57 that is threaded thereinto.

Integrally formed on the base 25 and joining with the standard is a raised rib like element 58 that is provided with a downwardly inclined bore or passage 59 the inner end of which connects with the vertical bore or passage 56. The outer end of the inclined passage 59 is enlarged and a short sleeve element 60 is pressed therein and a wing screw 61 is threaded through the sleeve 60. The sleeve 60 is rigidly held in place by means of a pin 62 that is passed through the rib like element 58 and a part of one side of the sleeve 60.

In the bore 58 is slidably positioned a plunger 63, the outer end of which is engaged by the inner end of the wing screw 61. Resting against the inner end of the plunger 63 is a resilient cup 64 that is made of leather, rubber or any other suitable material.

In the cylinder 55 is a plunger element 65, the lower portion of which is provided with a bore 66. The lower end of the bore 66 is enlarged and a disc 67 is tightly pressed therein and functions as a support or rest for the lower end of a coil spring 68. The upper end of the plunger 65 is provided with a depression 69 so that the upper edge of the plunger 65 around the depression 69 forms a ball seat 70 on which the ball 35 rests. The upper end of the plunger 65 is provided with a vertically positioned slot 71 that extends well below the top of the bore 66. A pin 72 is passed through both sides of the collar 28 and both sides of the upper end of the standard 26 and is positioned in the slot 71 of the plunger 65, and the upper end of the spring 68 engages and presses against the pin 72, the pin then serving several purposes; first, the pin 72 serves to rigidly lock the sleeve 28 on the upper end of the standard 26; second, the pin 72 serves as an element against which the upper end of the spring 68 may push, third, the pin 72 serves as an element to retain the plunger 65 in, and limit the upper movement of the plunger 65 in the cylinder 55; and fourth, the pin 72 prevents any rotary movement of the plunger 55. Beneath the plunger 55 and engaging the bottom thereof is a resilient cup 73 that is made of leather, rubber or any other suitable material.

The cylinder 55, beneath the cup 73, and the passages 56 and 59 are filled with any suitable hydraulic liquid, preferably oil.

The operation of the device shown in Figures 8 to 15 inclusive is as follows: The work is attached to the work holder device 42 on the pin 41 and moved to the desired adjusted position, the same as previously described; the work having been so positioned, the wing screw 61 is turned to screw inwardly, whereupon the inner end of the screw 61 presses the plunger 63 and cup 64 inwardly in the passage 59, part of the hydraulic liquid in the passages 59 and 56 is transferred and forced into the cylinder 55, whereupon the pressure therefrom will force the cup 73 and plunger 65 upwardly against the pressure of the spring 68 to rigidly clamp and hold the ball 35 between the two ball seats 39 and 70 to rigidly hold the work in its adjusted position the same as previously described.

Now if it is desired to change the position of the work, the wing screw 61 is screwed outwardly, whereupon the spring 68 will move the plunger 65 and cup 73 downwardly the distance permitted by the turning of the wing screw 61 and thereby release the pressure on the ball 35, whereupon the ball 35 and work support pin and plate 41—42, and ball socket cap 38 and collar 30 may be freely moved to any new position for holding the work in the new position. The work being repositioned, the wing screw 61 may again be screwed inwardly, whereupon the ball 35 will again be clamped and rigidly held between the ball seats 39 and 70 to rigidly hold the work in its readjusted position the same as previously described.

In case it is desired to drain or replenish the hydraulic liquid in the cylinder 55 and passages 56 and 59, the device may be turned up side down and the plug 57 may be screwed from the end of the passage 56, whereupon the hydraulic liquid may be emptied or added to as desired. The amount of hydraulic liquid having been so adjusted, the plug 57 may be replaced in the end of the passage 56 and the device is again ready for use.

In Figures 16 to 24 inclusive is shown a further improved hydraulically operated design of the work holder device. In this design the device has the work holder plate 42 mounted on the pin support 41 that is carried by the ball 35 that is adjustably mounted in the swivelly mounted ball socket cap 38 and is held in place by the collar 30 that is rigidly attached thereto and which revolvably underlies the sleeve 28 which is rigidly attached to the upper end of the standard 26, there being a ball support element 32 that is housed in the ball socket cap element 38 and resting on the upper ends of the sleeve 28 and standard 26, and on which rests the ball 35. The ball support element 32 is stationed against rotary movement by the pin 37 being rigidly mounted in the sleeve 28 and standard 26 and projecting therefrom into the slot 36 in the ball support element 32. All the foregoing mentioned parts and the assembly thereof are identical to those mentioned and described in the other figures of the drawings.

In the design, Figures 16 to 24 inclusive, the standard is shown as having the bore 55 in the upper end thereof which forms a cylinder from which downwardly extends the smaller bore or passage 56 to and through the foot or base element 25. In the lower end of the bore 56 is threaded a plug 57, the same as, and for the same purposes as previously described.

As shown in this design there is integrally formed on the base element 25 and joining with the standard 26, two rib-like elements 58a and 74 that extend radially in opposite directions on the base 25 and from the standard 26.

In the rib-like element 74 is a bore or passage 76, the inner end of which connects with the passage 56. The outer end of the passage 76 is enlarged and a sleeve 77 is tightly pressed therein and is rigidly held in place by means of a pin 78 that is passed through the rib-like element 74 and a part of one side of the sleeve 77.

A wing screw 79 is threaded through the sleeve 77 and engages a plunger 80 that is slidably positioned in the outer end of the passage 76. In the passage 76 and resting against the inner end of the plunger 80 is a resilient cup element 81 that is made of leather, rubber or any other suitable material.

In the rib like element 58a is a downwardly inclined passage 59a, the inner end of which connects with the vertical passage 56. In the outer portion of the passage 59a is slidably positioned a plunger 82. In the passage 59a and resting against the inner end of the plunger 82 is a resilient cup 83 that is made of leather, rubber or any other suitable material.

The outer end of the rib-like element 58a is provided with a slot 84 that is centered on and is in alignment with the center axis of the passage 59a.

In the slot 84 is a cam element 85 that is pivotally mounted on a pin 86 that is positioned on and traverses the center axis of the passage 59a and positions the cam 85 in engagement with the outer end of the plunger 82 so as to operate the plunger 82 as will later be described. Integrally formed on the cam 85 is a handle element 87 by which the cam 85 may be revolved or rocked to operate the plunger 82 as will later be described.

Slidably positioned in the upper portion of the cylinder 55 is a plunger element 88. Extending from the lower end of the plunger 88 to a point a little below the top end of the plunger 88 is a bore 89. At the top of the bore 89 is a transverse elongated hole 90 for the reception of the pin 72 which passes through both sides of the sleeve 28 and the upper end of the standard 26 as well as the elongated hole 90 in the plunger 88. The lower end of the bore 89 is enlarged and a disc 91 is tightly pressed therein.

In the bore 89 is a compression spring 65 the upper end of which bears against the pin 72 and the lower end of which bears against the disc 91.

Beneath the plunger 88 and bearing against the bottom end of the plunger 88 and the disc 91 therein is a resilient cup 92 that is made of leather, rubber or any other suitable material.

The operation of the device as shown in Figures 16 to 24 inclusive is as follows; The work is placed on and attached to the work support plate 42 and the work moved to any desired position the same as previously described. The work having been so positioned, the cam handle 87 may be rocked downwardly to the position shown in Figures 17 and 19, whereupon the plunger 82 and cup 83 are forced to move forward in the passage 59a by the action of the cam 85 on the plunger 82, thereby causing part of the hydraulic liquid in the passages 59a and 56 to be forced into the cylinder 55 which in turn presses against the cup 92 and forces the cup 92 and plunger 88 resting thereon to move upwardly against the pressure of the spring 65 and the load of the ball 35. In the upward movement of the plunger 88 the upper end of the plunger 88 engages and raises the ball support element 32 to rigidly bind and hold the ball 35 between the two ball seats 34 and 39 the same as previously described so as to hold the work in its adjusted position as described.

To release the work for readjustment, the cam lever 87 may be raised whereby the cam is rocked to a receding position, whereupon the spring 65 will move the plunger 88 downwardly releasing the pressure on the ball 35 so it is free to be moved, and at the same time forcing some of the hydraulic liquid out of the cylinder 55 through the passages 56 and 59a and move the cup 83 and plunger 82 rearwardly as will be permitted by the receded position of the cam 85.

The amount of throw of the lever and cam 87—85 required to cause the ball support element 32 to move up or down to clamp or release the ball 35 between the ball seats 34 and 39 may be adjusted by screwing the adjusting screw 79 in or out whereupon some of the hydraulic liquid in the passage 76 will be forced into the passage 56, or some of the liquid in the passage 56 may be withdrawn into the passage 76, and therefore the throw of the lever 87 may be readily and quickly adjusted by the operator of the device.

Such modifications of my invention may be employed as lie within the scope of the appended claims without departing from the spirit and intention of the invention. Now having fully shown and described my invention what I claim is;

1. In a work holder device of the kind described; a base, a hollow standard carried by said base, a ball socket, said ball socket being revolvably mounted on the upper end of said standard, a ball support, said ball support being housed within said ball socket, said ball socket and ball support each having a narrow annular ball seat, a ball, said ball being positioned in the ball socket and between said ball seats, said socket having a slot therein and means movable in said slot and rigidly mounted on said ball for carrying a work support element, plunger means operable within the hollow of said standard and engaging the ball support for lowering and raising the ball support to release or bind said ball in adjusted positions between said annular ball seats and means for adjusting the elevation of said plunger means in said standard relative to its operating means, said means for adjusting the elevation of said plunger means including a cylinder connected with said standard, a plunger slidably mounted in said cylinder, said cylinder being fillable with a hydraulic material, a screw and a finger hold on one end thereof, said screw being threadably carried in the outer end of said cylinder, the inner end of said screw engaging the plunger in said cylinder for movement thereof upon turning of the screw to actuate said plunger means through the movement of the hydraulic material in said cylinder to bind and hold the ball as described, said hollow in said standard being connected with the space in said cylinder; and spring means for urging the movement of the ball support member to release pressure on the ball for adjusting purposes.

2. In a work support device as defined in claim 1 and having a second cylinder, said second cylinder being connected with said first cylinder, the space in said second cylinder and said first cylinder and the hollow of said standard being connected, a plunger in said second cylinder, and means engageable with said plunger in said second cylinder for moving said last mentioned plunger in said second cylinder, said movement of said second mentioned plunger being adapted for adjusting said ball.

3. In a work support device, in combination, a work holder; a ball; a pin rigidly mounted on said ball; a ball socket for releasably binding said ball, said ball socket including a cap having a skirt thereon, said cap having a slot therein, said slot extending substantially downwardly from the vertical axis at the top of said cap to a point on the side thereof, and a ball support element, said cap and said ball support element each having an annular ball seat thereon; said pin extending through said slot in said cap, said pin at one end thereof having said work holder mounted thereon; said ball support element being slidably positioned within the skirt of said cap, said pin being rigidly supported on said ball and being movable in said slot; said ball being positioned in said socket and engageable on the surface thereof by said annular ball seats a hollow standard supporting said ball socket; a plunger slidable in said standard and adapted to engage said ball support element for the movement thereof to cause respective releasing and retention of said ball; spring means engaging said plunger for urging the downward movement of said plunger to release pressure on said ball support element; a shaft rotatably mounted in said standard; an eccentric pin carried on said shaft, said shaft and said eccentric pin having means for actuating said plunger, said plunger being supported by the eccentric pin; means whereby the length of said plunger may be adjusted and ball means intermediate said plunger and said eccentric pin for reducing the area of engagement of said pin and said plunger.

4. In a work support device, in combination, a work holder; a ball; a pin rigidly mounted on said ball; a ball socket for releasably binding said ball, said ball socket including a cap having a skirt thereon, said cap having a slot therein, said slot extending substantially downwardly from the vertical axis at the top of said cap to a point on the side thereof, and a ball support element, said cap and said ball support element each having an annular ball seat thereon; said pin extending through said slot in said cap, said pin at one end thereof having said work holder mounted thereon; said ball support element being slidably positioned within the skirt of said cap, said pin being rigidly supported on said ball and being movable in said slot; said ball being positioned in said socket and engageable on the surface thereof by said annular ball seats; a hollow standard supporting said ball socket; a plunger slidable in said hollow standard and adapted to engage said ball support element for the movement thereof to cause respective releasing and retention of said ball; spring means engaging said plunger for urging the downward movement of said plunger to release pressure on said ball support element; a cylinder connected to said standard, the space in said cylinder being communicatively connected to the hollow in said standard, said plunger being normally movable in the upper portions of the hollow in said standard; a second plunger movable in said cylinder; and means for adjusting said second plunger.

5. In combination, in a work holding device as recited in claim 4, a second cylinder, the space of said second cylinder being communicatively connected with the hollow of said standard and normally fillable with an hydraulic material; a third plunger in the outer end of said second cylinder; screw means for adjusting said third plunger, and wherein said means for adjusting said second plunger includes a cam engageable by the outer end of said second plunger, said second plunger being adapted to provide for releasing said ball from engagement for gross adjustments thereof, said plunger in said second mentioned cylinder being adapted to provide for releasing said ball for minute and fine adjustments thereof.

6. In a work holder device, in combination, a ball; a pin rigidly carried on said ball; a work holding element mounted on one end of said pin; a socket for said ball, said socket including a cap and a ball rest element, said cap and said ball rest element each having an annular ball seat therein; a hollow standard supporting said socket, said standard having a vertical space therein; a plunger slidable in said vertical space; a cylinder connected to said standard, the space of said cylinder being communicatively connected with the hollow of said standard; a second plunger slidably positioned in said cylinder, said first plunger being adapted to engage and disengage said ball rest to respectively grip and release said ball; means mounted on said cylinder for causing the movement of said second mentioned plunger; and spring means engaging said plunger for urging movement of said first mentioned plunger in order to release pressure on the ball.

7. In a work support device, the combination of a work holder, a cap element and a ball support element forming a socket therebetween; a ball mounted in said socket and adapted to be engaged on the surface thereof and releasably retained in said socket; a standard adapted to support said ball support element and said cap, said standard having a vertical passage therein; a plunger slidably positioned in the passage in said standard; means for adjusting the elevation of said plunger in said standard; spring means engaging said plunger for urging the disengaging movement of said plunger with said ball support element, said plunger being adapted in some positions thereof to cause said ball socket to firmly grip said ball, said plunger in other positions thereof being adapted to cause a release of said ball by said socket to permit movement of said ball within said socket; said cap having a slot therein; and a pin at one end thereof rigidly mounted on said ball and at the other end thereof being adapted to support said work holder.

CLEMON W. BARKER.

REFERENCES CITED

The following references are of record in the file of this patent:

UNITED STATES PATENTS

| Number | Name | Date |
|---|---|---|
| 198,176 | Alexander | Dec. 18, 1877 |
| 245,659 | Renner, Jr. | Aug. 16, 1881 |
| 1,897,581 | McNab | Feb. 14, 1933 |
| 1,955,635 | Kelly | Apr. 17, 1934 |
| 2,354,937 | Barker | Aug. 1, 1944 |

FOREIGN PATENTS

| Number | Country | Date |
|---|---|---|
| 458,112 | France | Oct. 3, 1913 |
| 661,086 | France | July 20, 1929 |
| 489,056 | France | Aug. 20, 1918 |
| 278,993 | Italy | Apr. 26, 1929 |
| 799,604 | France | Apr. 11, 1936 |